United States Patent [19]

Weyer

[11] Patent Number: 4,683,767
[45] Date of Patent: Aug. 4, 1987

[54] ROTARY ACTUATOR WITH BACKLASH ELMINATION

[76] Inventor: Paul P. Weyer, 1462 Blake St., Enumclaw, Wash. 98022

[21] Appl. No.: 692,293

[22] Filed: Jan. 17, 1985

Related U.S. Application Data

[63] Continuation-in-part of Ser. No. 575,228, Jan. 30, 1984, Pat. No. 4,590,816, and Ser. No. 662,256, Oct. 17, 1984.

[51] Int. Cl.⁴ .......................... F16H 55/18; F01B 3/00
[52] U.S. Cl. .............................. 74/409; 74/424.8 NA; 74/441; 92/31; 92/33
[58] Field of Search ................. 92/31, 32, 33; 74/458, 74/459, 424.8 NA, 424.8 R, 409, 440, 441

[56] References Cited

U.S. PATENT DOCUMENTS

| | | | |
|---|---|---|---|
| 2,067,357 | 1/1937 | Terry | 74/424.8 R |
| 2,791,128 | 5/1957 | Geyer et al. | 74/441 |
| 2,945,387 | 7/1960 | Geyer | 74/441 |
| 2,959,064 | 11/1960 | Geyer et al. | 92/33 |
| 3,020,775 | 2/1962 | Musser | 74/440 |
| 3,187,592 | 6/1965 | Geyer | 92/33 |
| 3,255,806 | 6/1966 | Meyer et al. | 92/33 |
| 3,595,094 | 7/1971 | Lemor | 74/459 |
| 4,036,074 | 7/1977 | Bodnar | 74/440 |

FOREIGN PATENT DOCUMENTS

0386809 4/1965 Switzerland .......................... 74/409

OTHER PUBLICATIONS

C. T. Bower, How to Provide for Backlash in Threaded Parts, 4/14/82, pp. 188–189 of Mechanisms, Linkages, & Mechanical Controls by Charonis.

Primary Examiner—Lawrence J. Staab
Assistant Examiner—Martin G. Belisario
Attorney, Agent, or Firm—Seed and Berry

[57] ABSTRACT

A fluid-powered helical actuator including a cylindrical body; a rotatable output member supported for rotation relative to the body and connectable to an external device; first and second independently rotatable sleeves reciprocally mounted within the body; a piston reciprocally mounted within the body for application of fluid pressure to one or the other opposing sides thereof to produce axial movement, the piston operatively engages at least one or the other of the sleeves to axially move the sleeves in response to axial movement of the piston; and torque-transmitting elements for transmitting torque between the first sleeve and the body, between the first sleeve and the output member, between the second sleeve and the output member, and between the second sleeve and the body. An adjustment member is provided for selectively moving the first sleeve relative to the second sleeve to axially preload the sleeves for eliminating backlash in the toque-transmitting elements as the piston moves from one axial direction to the other in response to selective application of fluid pressure to the piston. In one embodiment the output member has two parts which are oppositely rotated to preload the sleeves. In other embodiments ring gears are employed with one being axially movable for preloading. In yet other embodiments the axial preloading is accomplished by axial separation of the sleeves using a resilient member or set screws.

29 Claims, 10 Drawing Figures

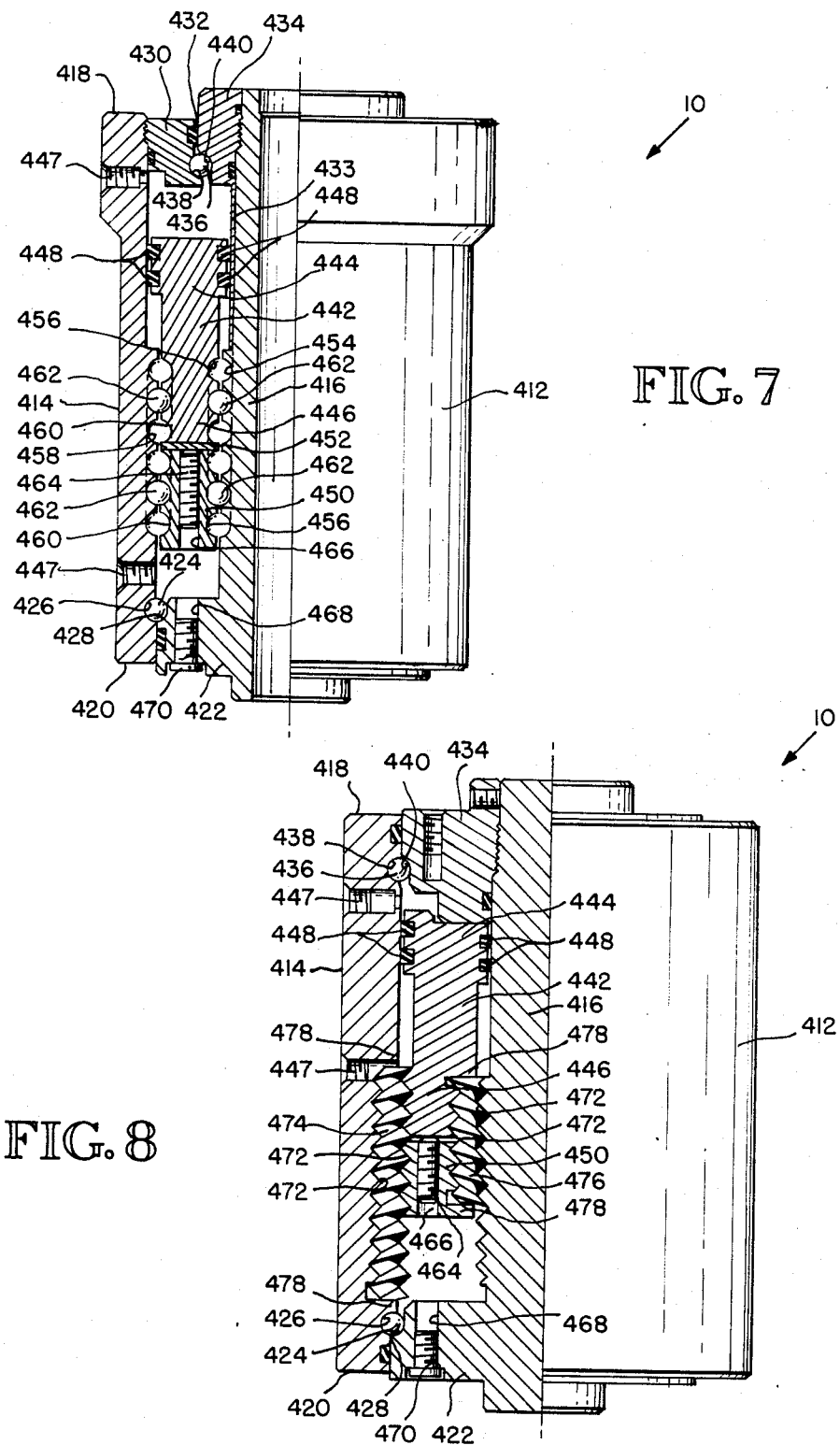

ROTARY ACTUATOR WITH BACKLASH ELMINATION

DESCRIPTION

Cross-Reference to Related Applications

This is a continuation-in-part of Ser. No. 575,228, filed Jan. 30, 1984, now Patent No. 4,590,816, and application Ser. No. 662,256, filed Oct. 17, 1984.

TECHNICAL FIELD

The present invention relates generally to actuators, and more particularly, to fluid-powered actuators of the type in which axial movement of a piston produces relative movement between a body and an output member.

BACKGROUND ART

Rotary helically splined actuators have been employed in the past to achieve the advantages of high-torque output from a simple linear piston-and-cylinder drive arrangement. The actuators typically employed a cylindrical body with an elongated rotary output shaft extending from end to end coaxially within the body, with an end portion of the shaft providing the drive output. Disposed between the body and the shaft is a piston sleeve splined to cooperate with corresponding splines on the body interior and the output shaft exterior. The piston is reciprocally mounted within the body and has a head for the application of fluid pressure to one or the other opposing sides thereof to produce axial movement of the piston. The sleeve is elongated and coaxially receives the shaft therein.

As the piston linearly reciprocates in an axial direction within the body, the outer splines of the sleeve engage the splines of the body to cause rotation of the sleeve. The resulting linear and rotational movement of the sleeve is transmitted through the inner splines of the sleeve to the splines of the shaft to cause the shaft to rotate. Bearings are typically supplied to rotatably support one or both ends of the shaft relative to the body.

With such an arrangement, as the piston reciprocally moves from one axial direction to the other to produce relative rotational movement between the body and the shaft in response to application of fluid pressure to the piston head, backlash results from the slack existing between the intermeshing splines of the piston sleeve and the body and the intermeshing splines of the piston sleeve and the shaft. While accurate machining of the splines will reduce the backlash problem, this procedure substantially increases the manufacturing cost. Even with accurate machining, conventional machining techniques are virtually incapable of totally eliminating the slack which produces the backlash problem. Furthermore, to the extent more accurate tolerances produce actuator parts which fit tightly together and reduce slack, assembly of the actuator becomes difficult. While accurate machining reduces slack initially, should the splined parts wear during usage or otherwise lose their original tolerances, no means exist for elimination of the slack that develops without disassembly of the actuator and possible remachining or replacement of the splined parts.

It will therefore be appreciated that there has been a significant need for a fluid-powered rotary actuator which does not require exceptionally accurate machining of the torque-transmitting parts to eliminate slack that produces backlash. The actuator should be easy to assemble and provide means for substantially complete elimination of the slack causing the backlash problem after the actuator is assembled. Elimination of the slack should be accomplished in a simple manner without requiring disassembly of the torque-transmitting parts from the body. Furthermore, the means for elimination of the slack should, with one adjustment, simultaneously remove the slack existing between all of the torque-transmitting parts within the body which translate linear movement of the piston into rotational movement of the output member. Means should also be provided for automatic elimination of backlash during both assembly of the actuator and its subsequent use without requiring any adjustment by the user, particularly for actuators of small size which have space limitations. The present invention fulfills this need and further provides other related advantages.

DISCLOSURE OF INVENTION

The present invention resides in a fluid-powered actuator having a body, a rotatable member supported for rotation relative to the body and connectable to an external device, first and second coaxial members reciprocally mounted within the body, and at least one piston reciprocally mounted within the body for application of fluid pressure to one or the other opposing sides thereof to produce axial movement of the piston. The piston operatively engages at least one or the other of the first and second members to axially move the members in response to axial movement of the piston. The first and second members are independently rotatable.

The actuator further includes first torque-transmitting means for transmitting torque between the first member and the body, second torque-transmitting means for transmitting torque between the first member and the rotatable member, third torque-transmitting means for transmitting torque between the second member and the rotatable member, and fourth torque-transmitting means for transmitting torque between the second member and the body. The first, second, third and fourth torque-transmitting means further provide for unidirectional movement of the first and second members in one and then the other axial direction as the piston reciprocates during fluid-powered operation. The linear movement of the piston produces relative rotational movement between the body and the rotatable member.

The actuator also has adjustment means for selectively moving the first member relative to the second member to axially preload the first and second members for substantially eliminating backlash as the piston moves from one axial direction to the other. As such, backlash resulting from slack in the first, second, third and fourth torque-transmitting means can be avoided by adjustment prior to fluid-powered operation of the actuator.

In the first embodiment of the invention, the rotatable member includes first and second coaxially mounted and independently rotatable portions, with the first portion being positioned adjacent to the second portion. The second torque-transmitting means transmits torque between the first member and the first portion, and the third torque-transmitting means transmits torque between the second member and the second portion. In this first embodiment, the adjustment means includes means for selectively rotating the first portion relative to the second portion by a selected amount to axially preload the first and second members. The selective rotating means includes a camming link extending between and bearing upon each of the first and second portions for relative rotational movement thereof in opposite rotational directions upon movement of the link to move the first and second members toward each other and into engagement. The first and second portions are annular in shape, and the first portion has an attachment flange extending outward beyond the body for attachment to the external device.

In a second embodiment of the invention, the first torque-transmitting means includes a first ring member attached to the body, and the fourth torque-transmitting means includes a second ring member attached to the body. The first ring member is axially movable and restrained against rotational movement, with axial movement of the first ring member providing rotational movement to the first member. The second ring member is restrained against rotational movement. The adjustment means includes means for selectively moving the first ring member axially to produce movement of the first member relative to the second member to axially preload the first and second members. The means for moving the first ring member includes an end cap threadably connected to the body and axially bearing on the first ring member.

In a third embodiment similar to the second embodiment, a bearing ring is positioned between the end cap and the first ring member. In both the second and third embodiments, the second ring member is restrained against axial movement in a direction away from the end cap.

In an fourth embodiment of the invention, the adjustment means includes a resilient member positioned between and engaging the first and second members. The resilient member is in a compressed state when in position between the first and second members and has sufficient resiliency to exert an axially outward force on the first and second members to move the first member relative to the second member for their axial preloading to substantially eliminate backlash. The axially outward force exerted by the resilient member is at least as great as the axially inward force exerted by the piston on the resilient member through the first and second members during normal fluid-powered operation of the actuator. As such, the preloading of the first and second members is substantially maintained during operation.

In this fourth embodiment, the piston has first and second piston portions positioned between the first and second members, with the resilient member positioned between and engaging the first and second piston portions. In one form of this embodiment, the resilient member is an elastomeric member sized to be placed in the compressed state between the first and second piston portions during assembly of the actuator, and the elastomeric member also serves as a piston seal.

In a fifth embodiment of the invention, the adjustment means includes an axially adjustable member extending between and engaging each of the first and second members. The adjustable member provides an adjustable and oppositely directed axial force on the first and second members to move the first member relative to the second member for axially preloading the first and second members. The adjustable member is adjustably attached to the second member and projects toward and slidably engages the first member. The adjustable member is selectively extendable to exert an axially outward force on the first and second members.

Means are provided for access to the adjustable member through the body for external adjustment thereof without disassembling the second sleeve from the body.

In the presently preferred embodiments of the invention, the first, second, third and fourth torque-transmitting means include coacting grooves formed on the first and second members, on the body, and on the rotatable member. The grooves may be intermeshing splines, ball races positioned in confronting and corresponding relationship to form ball channels with one or more balls seated in each of the channels, or screw threads positioned in corresponding relationship with one or more roller screws seated therebetween.

Other features and advantages of the invention will become apparent from the following detailed description, taken in conjunction with the accompanying drawings.

BRIEF DESCRIPTION OF THE DRAWINGS

FIG. 7 is a side elevational, sectional view of a fifth alternative embodiment of the invention, showing a ball screw actuator using a set screw adjustment;

FIG. 8 is a side elevational, sectional view of a sixth alternative embodiment of the invention, showing a roller screw actuator using a set screw adjustment;

BEST MODE FOR CARRYING OUT THE INVENTION

Figure 1:
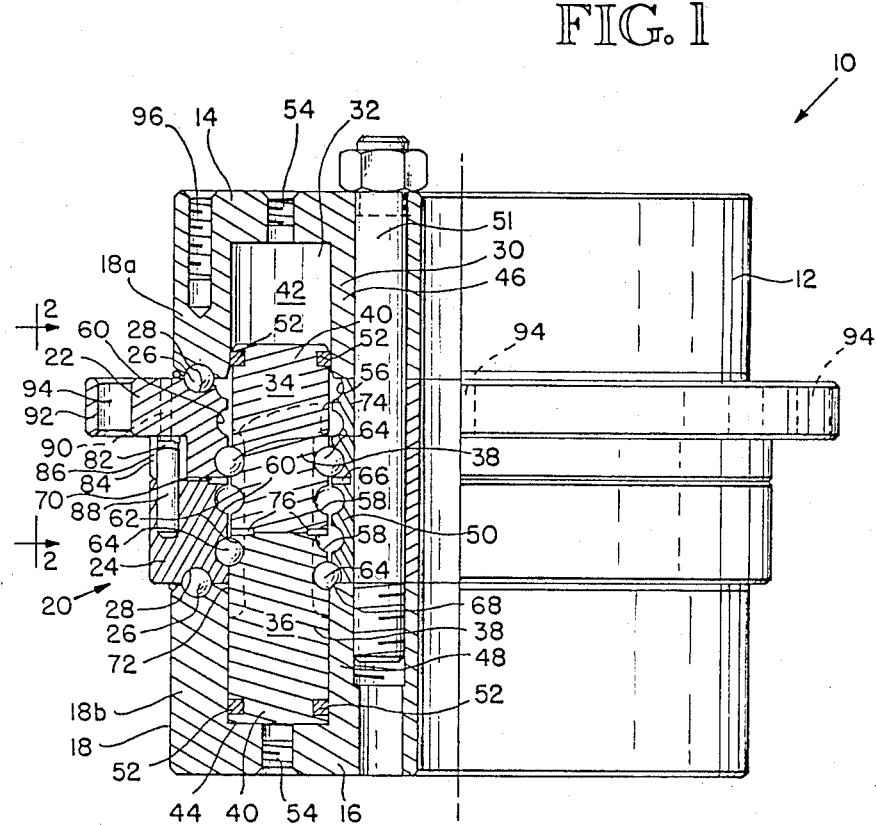
FIG. 1 is a side elevational, sectional view of a fluid-powered helical ball screw actuator embodying the present invention and using a flanged output member.

As shown in the drawings for purposes of illustration, the present invention is embodied in a fluid-powered rotary actuator, indicated generally by reference numeral 10. A first embodiment of the actuator 10 is shown in FIG. 1 and includes a generally cylindrical body 12 having first and second axially spaced-apart end walls 14 and 16, and an exterior sidewall 18. The exterior sidewall 18 is formed by a pair of circumferentially extending first and second support arms 18a and 18b rigidly attached to the end walls 14 and 16. The first and second support arms 18a and 18b project generally axially inward from the first and second end walls 14 and 16, respectively, to define a circumferential space 20 therebetween.

The actuator 10 further includes first and second coaxially oriented and independently rotatable annular members 22 and 24 positioned in the circumferential space 20 and supported for substantially coaxial rotation relative to the body 12 by ball bearings 26. The ball bearings 26 are disposed in confronting and corresponding pairs of ball races 28 formed on the axially inward facing end walls of the support arms 18a and 18b and the axially outward facing annular end walls of the annular members 22 and 24. The ball bearings 26 in the ball races 28 rotatably support the annular members 22 and 24 relative to the support arms 18a and 18b against axial thrust.

The body 12 further includes a circumferential interior sidewall 30 extending between the end walls 14 and 16, and positioned radially inward from the exterior sidewall 18 to define an annular chamber 32 therebetween. The interior sidewall 30 is formed by a pair of circumferentially extending first and second interior sidewall sections 46 and 48 rigidly attached to the end walls 14 and 16, respectively, with a circumferential midsection wall 50 fixedly positioned therebetween.

With such construction, the body 12 may be manufactured of two half-assemblies, the first formed by the first support arm 18a, the first end wall 14 and the first interior sidewall section 46, and the other formed by the second support arm 18b, the second end wall 16 and the second interior sidewall section 48. The body half-assemblies may be constructed as an integral unit, and may be secured together in fixed relative relation, with the midsection wall 50 positioned therebetween, by a plurality of elongated, circumferentially spaced fasteners 51. The fasteners 51 are positioned in bores extending between the half assemblies through the midsection wall 50.

The actuator 10 further includes a cylindrical first piston sleeve 34 coaxially and reciprocally disposed within the chamber 32 toward the first end wall 14 and a second piston sleeve 36 coaxially and reciprocally disposed within the chamber toward the second end wall 16. The piston sleeves 34 and 36 each have a sleeve portion 38 and an annular piston head portion 40 fixedly attached thereto and located to an axially outward side thereof. The sleeve portions 38 of the piston sleeves 34 and 36 are in endwise sliding engagement with each other, and the piston sleeves are independently rotatable within at least a limited range for backlash adjustment purposes, as will be described below.

The piston head portion 40 of the first piston sleeve 34 defines a first fluid-tight compartment 42 of the chamber 32 to an axially outward side of the head portion, and application of fluid pressure to the first compartment produces axial movement of the first piston sleeve toward the second end wall 16. The piston head portion 40 of the second piston sleeve 36 defines a fluid-tight compartment 44 of the chamber 32 to an axially outward side of the head portion, and application of fluid pressure to the second compartment produces axial movement of the second piston sleeve toward the first body end wall 14. The actuator 10 provides relative rotational movement between the body 12 and the annular members 22 and 24 through the conversion of linear movement of the piston sleeves 34 and 36 into rotational movement of the annular members.

The piston head portions 40 of the piston sleeves 34 and 36 each carry conventional inner and outer seals 52 disposed between the head portion and corresponding smooth interior wall portions of the exterior and interior sidewalls 18 and 30 to define the fluid-tight compartments 42 and 44. The smooth sidewall wall portions have sufficient axial length to accommodate the full stroke of the piston sleeves 34 and 36 within the chamber 32. Reciprocation of the piston sleeves 34 and 36 within the chamber 32 occurs when hydraulic fluid or air under pressure selectively enters through ports 54 in the first and second end walls 14 and 16, which communicate with the fluid-tight compartments 42 and 44.

In the embodiment of the invention shown in FIG. 1, the midsection wall 50 is manufactured of a hardened material and has a helical ball race 56 integrally formed on a radially outward facing wall. The radially inward facing walls of the sleeve portions 38 of the piston sleeves 34 and 36 each have a helical ball race 58 integrally formed thereon confronting and corresponding to the ball race 56 on the midsection wall 50. The ball races 56 and 58 have substantially identical lead and pitch, and form a pair of laterally confined, variable length inner ball channels defined by the area of coincidence of the ball races on the first piston sleeve 34 and the midsection wall 50 and of the ball races on the second piston sleeve 36 and the midsection wall as the piston sleeves move axially within the chamber 32.

The radially inward facing annular walls of the annular members 22 and 24 each have a helical ball race 60 integrally formed thereon. The radially outward facing walls of the sleeve portions 38 of the piston sleeves 34 and 36 each have a helical ball race 62 integrally formed thereon confronting and corresponding to the ball races 60 of the annular members 22 and 24. The ball races 60 and 62 have substantially identical lead and pitch, and form a pair of laterally confined, variable length outer ball channels defined by the area of coincidence of the ball races on the first piston sleeve 34 and the first annular member 22 and of the ball races on the second piston sleeve 36 and the second annular member 24 as the piston sleeves move axially within the chamber 32.

A plurality of balls 64 are disposed in each of the inner and outer channels for transmission of torque between the first annular member 22 and the sleeve portion 38 of the first piston sleeve 34, between the sleeve portion of the first piston sleeve and the midsection wall 50, between the midsection wall and the sleeve portion of the second piston sleeve 36, and between the sleeve portion of the second piston sleeve and the second annular member 24. In the presently preferred embodiments of the invention, one to eight balls are used in each channel. The midsection wall 50, the sleeve portions 38 of the piston sleeves 34 and 36, and the annular members 22 and 24 are diametrically sized to produce minimal interspacing therebetween to increase ball contact with the inner and outer channels and promote improved torque transmission by the balls 64 carried therein.

An inner stop ring 66 is fixedly attached to the midsection wall 50 at its midportion, and projects radially outward sufficiently to engage and limit the travel of balls 64 through the inner channel formed by the ball race 56 on the midsection wall and the ball race 58 on the sleeve portion 38 of the first piston sleeve 34 in the direction toward the second end wall 16. An additional stop is formed by a beveled edge 68 of the second interior sidewall section 48 abutting and adjacent to an end of the ball race 56 on the midsection wall 50. This stop engages and limits the travel of balls 64 through the inner channel formed by the ball race 56 on the midsection wall 50 and the ball race 58 on the sleeve portion 38 of the second piston sleeve 36 in the direction toward the second end wall 16.

Similarly, an outer stop ring 70 is positioned between the annular members 22 and 24, and projects radially inward sufficiently to engage and limit the travel of balls 64 through the outer channel formed by the ball race 60 on the first annular member and the ball race 62 on the sleeve portion 38 of the first piston sleeve 34 in the direction toward the second end wall 16. An additional stop is formed by a beveled edge 72 of the second support arm 18b abutting and adjacent to an end of the ball race 60 of the second annular member 24. This stop engages and limits travel of the balls 64 through the outer channel formed by the ball race 60 on the second annular member 24 and the ball race 62 on the sleeve portion 38 of the second piston sleeve 36 in the direction toward the second end wall 16.

A pair of stops 74 formed by the blocked ends of the ball races 58 and 62 of the sleeve portion 38 of the first piston sleeve 34 engage and collect the balls 64 in the inner and outer channels formed by the ball races of the midsection wall 50, the first piston sleeve and the first annular member 22 to regroup the balls toward the inner and outer stop rings 66 and 70 as the first piston sleeve travels in the direction toward the second end wall 16. A similar function is performed by a pair of inner and outer stop rings 76 positioned between the sleeve portions 38 of the piston sleeves 34 and 36, and projecting sufficiently to engage and collect the balls 64 in the inner and outer channels formed by the ball races of the midsection wall 50, the second piston sleeve and the second annular member 24 to regroup the balls toward the beveled stop edges 68 and 72 as the second piston sleeve travels in the direction toward the second end wall 16. It is noted that the stops 74 and the stop rings 76 will only operate to regroup the balls in the inner and outer channels should they not roll fully against the stops limiting travel of the balls toward the second end wall 16 when the piston sleeves 34 and 36 complete their travel toward the second end wall.

The dashed lines on the sleeve portions 38 of the piston sleeves 34 and 36 indicate the axial length of the sleeve portions over which the ball races 58 and 62 extend and the manner of termination of the ball races. It is noted that for the embodiment of FIG. 1 the axially outward end of each of the ball races 58 and 62 terminates in the blocked end, and the ball races extend in the axially inward direction to the end of the sleeve portions 38 and the axially inward end of each of the ball races terminates in an open end running out into the chamber 32. The stop rings 76 prevent the balls 64 from passing out of the open ball race ends and into another open end.

As the piston sleeves 34 and 36, and the sleeve portions 38 forming a part thereof, linearly reciprocate between one or the other axial direction within the chamber 32, torque is transmitted by the balls 64 through the coaction of the ball race 56 on the midsection wall 50 with the ball races 58 on the sleeve portions 38 of the piston sleeves. The transmitted torque causes the piston sleeves 34 and 36 to rotate as they move axially. The resulting linear and rotational movement of the piston sleeves 34 and 36 is transmitted by the balls 64 through the coaction of the ball races 60 on the first and second annular members 22 and 24 with the ball races 62 on the piston sleeves 34 and 36. The transmitted torque causes the annular members 22 and 24 to rotate relative to the body 12 since axial movement of the annular members is restricted by the support arms 18a and 18b. As such, axial movement of the piston sleeves 34 and 36 is converted into relative rotational movement between the body 12 and the annular members 22 and 24. Since the sleeve portions 38 of the piston sleeves 34 and 36 are in engagement, the application of fluid pressure to the compartment 42 or 44 to move one piston sleeve in the direction toward the other will cause the other piston sleeve to move by the same amount, thereby producing simultaneous rotational movement of both annular members 22 and 24 in the same rotational direction.

As measured with the piston sleeves 34 and 36 positioned with the piston head portion 40 of the first piston sleeve engaging the second end wall 16, as shown in FIG. 1, the ball races 58 and 62 on the sleeve portion 38 of the first piston sleeve extend over an axial length of the sleeve portion projecting beyond the inner and outer stop rings 66 and 70 toward the second end wall 16 at least one-half of the distance of the end-to-end axial travel of the piston sleeves within the chamber 32. The balls 64 disposed in the inner and outer channels travel along the channels as they roll approximately one-half the distance the piston sleeves travel with respect to the body 12. To accommodate the slower travel of the balls 64, the ball races must extend over a sufficient length of the sleeve portions 38 beyond the inner and outer stop rings 66 and 70 to allow free rolling of the balls within the inner and outer channels during the entire piston sleeve travel between its end limits and avoid scuffing of the balls.

For the same reasons as discussed above, the ball races 58 and 62 on the sleeve portion 38 of the second piston sleeve 36 extend over an axial length of the sleeve portion projecting beyond the beveled stop edges 68 and 72 toward the second end wall 16 at least one-half of the distance of the end-to-end axial travel of the piston sleeve within the chamber 32.

To permit free rolling of the balls 64 in the ball races 56 and 60, the ball races 56 and 60 extend unblocked over an axial length of the midsection wall 50 and the annular members 22 and 24 beyond both the stops 74 and the stop rings 76, as measured with the piston sleeves 34 and 36 positioned with the piston head portion 40 of the first piston sleeve engaging the second end wall 16, by at least one-half of the distance of the end-to-end axial travel of the piston sleeves within the chamber 32.

Figure 2:
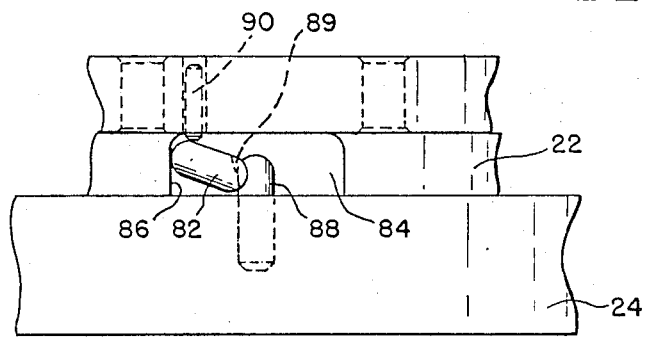
FIG. 2 is a fragmentary sectional view taken substantially along the lines 2—2 of FIG. 1.

The actuator 10 is further provided with a camming link 82 positioned within a circumferentially extending, outwardly facing opening 84 in the first annular member 22. The camming link extends between one end wall 86 of the opening 84 and a pin 88 fixedly attached to the second annular member 24 and projecting into the opening. The pin 88 fits into a recess 89 formed in the one end of the camming link 82 and helps maintain the camming link in place within the opening 84. The camming link 82 is angularly oriented, as best shown in FIG. 2, for selectively rotating the first annular member 22 relative to the second annular member 24 by a preselected amount upon turning of a link set screw 90. The link set screw 90 is threadably attached to the first annular member and projects into the opening 84 and engages a side of the camming link 82. In the presently preferred embodiment of the invention, the actuator 10 will be provided with several camming links 80 circumferentially spaced about the annular member 22.

Turning of the set screw 90 to extend the set screw further into the opening 84 and press against the camming link 82 applies oppositely directed rotational forces against the end wall 86 of the opening 84 and the pin 88 to rotate the annular members 22 and 24 in opposite directions by a selected amount. This rotation moves the first piston sleeve 34 relative to the second piston sleeve 36 to axially preload the first and second piston sleeves for substantially eliminating backlash as the piston sleeves move from one axial direction to the other in response to selective application of fluid pressure to the compartments 42 and 44. The backlash results from the slack or free movement between the torque-transmitting parts. The slack is usually due to the sizing of the ball races and the balls 64 positioned therein, which transmit torque between the piston sleeves 34 and 36 and both the body 12 and the annular members 22 and 24.

The relative circumferential positions of the end wall 86 and the pin 88 between which the camming link extends are selected such that the oppositely directed rotation of the annular members 22 and 24 produced by inward adjustment of the set screw 90 causes the sleeve portions 38 of the piston sleeves 34 and 36 to move toward each other. By inward adjustment of the set screw 90, the first annular member 22 is rotated relative to the second annular member 24 and carries the balls 64 in the ball race 60 formed on the first annular member into firm seated contact with the ball race 62 formed on the radially outward facing wall of the sleeve portion 38 of the first piston sleeve 34 to eliminate all slack therebetween. The continued inward adjustment of the set screw 90 rotates the first annular member 22 and transmits the rotation through the first piston sleeve 34. The ball race 58 on the radially inward facing wall of the sleeve portion 38 of the first piston sleeve 34 carries the balls 64 therein into firm seated contact with the ball race 56 formed on the midsection wall 50 to eliminate all slack therebetween. The continued inward adjustment of the set screw 90 causes the axial movement of the first piston sleeve 34 in the direction toward the second end wall 16.

At the same time the above-described action occurs and assuming the second annular member 24 is free to rotate, the inward adjustment of the set screw 90 causes rotation of the second annular member relative to the first annular member 22 in the opposite rotational direction and carries the balls 64 in the ball race 60 formed on the second annular member into firm seated contact with the ball race 62 formed on the radially outward facing wall of the sleeve portion 38 of the second piston sleeve 36 to eliminate all slack therebetween. The continued inward adjustment of the set screw 90 rotates the second annular member 24 and transmits the rotation through the second piston sleeve 36. The ball race 58 on the radially inward facing wall of the sleeve portion 38 of the second piston sleeve 36 carries the ball 64 therein into firm seated contact with the ball race 56 formed on the midsection wall 50 to eliminate all slack therebetween. The continued inward adjustment of the set screw 90 causes axial movement of the second piston sleeve 36 in the direction toward the first end wall 14 until the sleeve portions 38 of the piston sleeves 34 and 36 are in engagement and all slack has been removed from all ball races with the desired axial loading on the piston sleeves 34 and 36 achieved. The link set screw 90 is then left in the position at which all slack has been eliminated, and the relative rotational positions of the first and second annular members 22 and 24 are thereby locked and maintained during usage of the actuator 10. The same adjustment can be accomplished by holding one of the annular members 22 or 24 stationary and allowing the other to rotate in response to inward adjustment of the set screw.

Upon application of fluid pressure to one of the fluid-tight compartments 42 and 44 during fluid-powered operation of the actuator 10, the piston sleeves 34 and 36 move in unison, as do the annular members 22 and 24, with substantially all backlash eliminated as the piston sleeves reciprocate within the chamber 32. Should usage of the actuator 10 cause wear of the ball races or the balls therein, or should slack occur for any other reason, the slack can be easily removed in the same manner described above by further adjustment of the set screw 90. With the present invention, the ball races may be machined using conventional machining techniques with standard tolerances, and the slack which creates the backlash problem can be eliminated by adjustment prior to fluid-powered operation of the actuator 10. Furthermore, the ball races can be machined with a size to permit easy assembly of the actuator and any slack thereby introduced can be eliminated by adjustment.

In the embodiment of the invention shown in FIG. 1, the first annular member 22 has an attachment rim 92 extending radially outward beyond the exterior sidewall 18 of the body 12. The attachment rim 92 has a plurality of bore holes 94 therethrough for attachment of an external device (not shown). The peripheral shape of the annular member 22 may be varied depending on the method of attachment needed, and as such may be square, semi-circular or of any other shape, or may be formed with a right-angle attachment bracket. It is to be understood that the invention may be practiced with the annular member 22 rotatably driving the external device, or with the annular member being held stationary and the rotational drive being provided by the rotation of the body 12. Threaded recesses 96 are provided in the first end wall 14 for attachment of the body 12 to a stationary support frame (not shown) or to the external device.

It is to be understood that while the embodiment of the invention in FIG. 1 is shown and described using annular members 22 and 24 extending radially outward beyond the exterior sidewall 18, a similar actuator 10 can be constructed in which the annular members are positioned between the interior sidewall sections 46 and 48 and extend into a central axial opening in the body 12 through which the external device extends and is connected to the first annular member. With this actuator arrangement, the midsection wall 50 is positioned between the support arms 18a and 18b. It is to be further understood that while the embodiment of the invention shown in FIG. 1, as well as all of the embodiments of the invention which will be described hereinafter, show a particular form of torque transmission means, such as ball races with balls, splines or threaded members with roller screw bearings, the present invention can be used to eliminate the slack found with any of these or other torque-transmitting means. By the use of ball and roller screws the radial load handling characteristics of the actuator 10 are significantly increased since, unlike splines, the balls and roller screws provide significant support against radial loading in addition to the transmission of torque.

Figure 3:
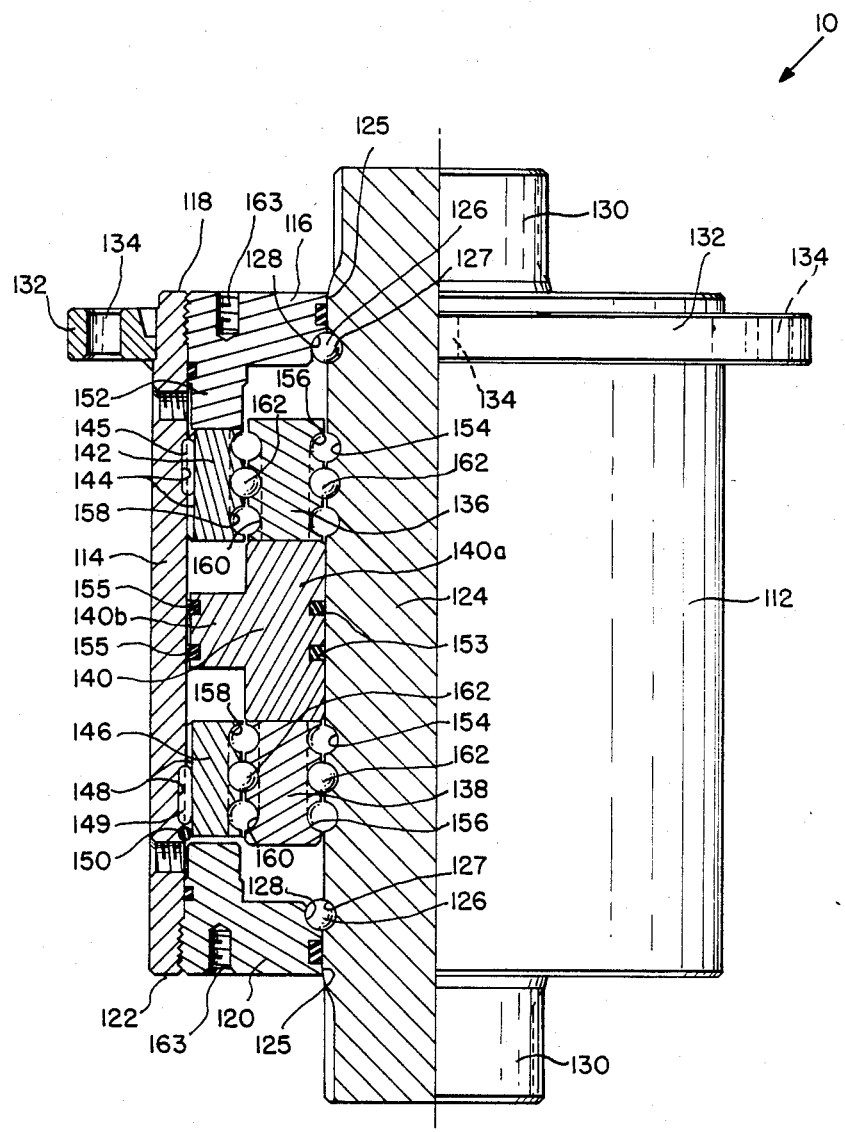
FIG. 3 is a side elevational, sectional view of a second alternative embodiment of the invention, showing a ball screw actuator using grooved ring gears with an adjusting end cap.

A second alternative embodiment of the invention is shown in FIG. 3. In this embodiment, the actuator 10 includes an elongated housing or body 112 having a cylindrical sidewall 114. A first end cap 116 is threadably attached to the body 112 at a first end 118 and a second end cap 120 is threadably attached to the body at a second end 122. A rotary output shaft 124 is coaxially positioned within the body 112 and supported for rotation relative to the body. The ends of the shaft 124 extend through a central aperture 125 in each of the caps 116 and 120, and the shaft is supported by axial thrust bearings 126 positioned between the caps and the shaft. A circumferential ball race 127 is formed on the each end portion of the shaft 124, and the caps 116 and 120 each have axially inward opening ball races 128 extending about the apertures 125 therein and confronting the corresponding ball race 127 on the shaft 124.

As will be described in more detail below, the first cap 116 is axially adjustable to eliminate backlash in the actuator 10 and the second cap 120 is axially adjustable to set the axial force of the thrust bearings 126 on the shaft 124. The shaft 124 extends outward through the apertures 125 in the caps 116 and 120 and has a splined portion 130 at each end for coupling to an external device (not shown). A circumferential flange 132 is fixedly attached to the body 112 and extends radially outward. A plurality of bore holes 134 extend through the flange 132 for attachment to a support frame (not shown).

As previously noted, for the embodiment shown in FIG. 1, the invention may be practiced with the shaft 124 rotatably driving the external device, or with the shaft being held stationary and the rotational drive being provided by rotation of the body 112. While the present embodiment has a splined portion 130 at each end of the shaft 124, the shaft may extend from just one end, or the end of the shaft may be recessed and not extend from the body 112. Other means than splines may be used for attachment of the external device to the shaft.

First sleeves 136 and 138 are coaxially and reciprocably mounted within the body 112 about the shaft 124 toward the first and second caps 116 and 120, respectively. The sleeves 136 and 138 are independently rotatable within at least a limited range for backlash adjustment purposes. Positioned between the sleeves 136 and 138 is an annular piston 140 coaxially and reciprocably mounted within the body about the shaft 124 for application of fluid pressure to one or the other opposing sides thereof to produce axial movement of the piston. The piston 140 slidably engages the axially inward facing end wall of each of the sleeves 136 and 138 and axially moves the sleeves in response to axial movement of the piston.

A grooved first ring gear 142 is coaxially positioned within the body 112 about the first sleeve 136 and adjacent to the sidewall 114. Grooves 144 formed on the interior of the sidewall 114 and the radially outward facing wall of the first ring gear 112 extend axially and have a pin 145 disposed longitudinally therein to permit free axial movement of the first ring gear relative to the body 112, but restrain the ring gear against rotational movement. A grooved second ring gear 146 is coaxially mounted within the body 112 about the second sleeve 138 and adjacent to the side wall 114. Grooves 148 formed on the interior of the sidewall 114 and the radially outward facing wall of the second ring gear 146 extend axially and have a pin 149 disposed longitudinally therein to permit free axial movement of the second ring gear, but restrain the ring gear against rotational movement. A circular stop ring 150 is seated in a circumferentially extending groove on the interior of the sidewall 114 and projects inward to limit axial travel of the second ring gear 146 in the direction toward the second end cap 120.

The first cap 116 has an axially inward projecting, circumferentially extending bearing wall 152. The bearing wall 152 engages the first ring gear 142 for axially inward movement of the first ring gear upon turning of the first cap 116 to advance the cap inward. The cap 116 thereby axially preloads the sleeves 136 and 138 to eliminate backlash, as will be described more fully below.

The piston 140 has a collar portion 140a with a radially inward facing wall positioned adjacent to a smooth exterior wall portion of the shaft 124 and with a pair of inner conventional seals 153 disposed therebetween. The piston also has a radially outward projecting flange portion 140b with a radially outward facing wall positioned adjacent to a smooth interior wall portion of the sidewall 114 and with a pair of conventional seals 155 disposed therebetween. The smooth interior wall portion of the sidewall 114 and the smooth exterior wall portion of the shaft 124 have sufficient axial length to accommodate the full stroke of the piston 140 within the body 112. The piston 140 defines a fluid tight compartment to each side thereof.

Reciprocation of the piston 140 within the body 112 occurs when hydraulic fluid or air under pressure selectively enters through ports in the sidewall 114 to each side of the piston which communicate with the fluid tight compartments. The radially outward facing wall of the collar portion 140a of the piston 140 is positioned sufficiently inward from the interior of the sidewall 114 to avoid interference with the ring gears 142 and 146 as the piston reciprocates within the body.

The shaft 124 has a pair of helical ball races 154 formed thereon, each axially spaced apart and confronting and corresponding to a helical ball race 156 formed on a radially inward facing wall of each of the sleeves 136 and 138. The ball races 154 and 156 have substantially identically lead and pitch, and form a pair of laterally confined, variable length inner ball channels defined by the area of coincidence of the corresponding ball races.

The radially inward facing walls of the ring gears 142 and 146 each have a helical ball race 158 formed thereon confronting and corresponding to a ball race 160 formed on the radially outward facing wall of each of the sleeves 136 and 138. The ball races 158 and 160 have substantially identical lead and pitch, and form a pair of laterally confined, variable length outer ball channels defined by the area of coincidence of the corresponding ball races. A plurality of balls 162 are disposed in each of the inner and outer channels for transmission of torque between the first ring gear 142 and the first sleeve 136, between the first sleeve and the shaft 124, between the shaft and the second sleeve 138, and between the second sleeve and the second ring gear 146.

As shown by the dashed lines on the sleeves 136 and 138, the ball races 156 and 160 have an axially outward end which terminates in a blocked end, and extend in the axially inward direction to the end of the sleeves and the axially inward end of each of the ball races terminates in an open end running out into the interior chamber of the body 112. The ball races 158 formed on the ring gears 142 and 146 have an axially inward end terminating in a blocked end, and extend in the axially outward direction to the end of the ring gears and the axially outward end of each of the ball races terminates in an open end running out into the interior chamber of the body 112. Both ends of the pair of ball races 154 formed on the shaft 124 terminate in blocked ends. The axially outward facing walls of the collar portion 140a of the piston 140 are positioned abutting and adjacent to the open ends of the ball races 156 and 160 and block the passage of the balls 162 therein.

The blocked ends of the ball races and the piston 140 blocking the open ends of the ball races 156 and 160 serve as stops and perform much the same function as described for the stops of the embodiment shown in FIG. 1 to engage and limit the travel of the balls through the inner and outer channels and to regroup the balls should they not roll fully back against the stops. In the manner described above for the embodiment of FIG. 1, the ball races extend over a sufficient axial length to permit the balls to roll freely within the inner and outer channels during the entire piston travel and avoid scuffing of the balls.

As the piston 140, and the sleeves 136 and 138 traveling therewith, linerally reciprocate between one or the other axial direction within the body 112, torque is transmitted by the balls 162 through the coaction of the ball races 158 on the ring gears 142 and 146 with the ball races 160 on the sleeves 136 and 138. The transmitted torque causes the sleeves 136 and 138 to rotate as they move axially. The resulting linear and rotational movement of the sleeves 136 and 138 is transmitted by the balls 162 through the coaction of the ball races 156 on the sleeves with the ball races 150 on the shaft 124. The transmitted torque causes the shaft 124 to rotate relative to the body 112 since axial movement of the shaft is restricted by the thrust bearings 126. As such, axial movement of the piston 140 is converted into relative rotational movement between the body 112 and the shaft 124. The application of fluid pressure to the compartment to one side of the piston 140 causes the piston to drive the sleeve positioned to the other side of the piston in a direction away from the compartment to which fluid was applied. The resulting rotation of the shaft 124 will cause the other sleeve to move by the same amount, thereby producing simultaneous movement of the sleeves in the same axial direction.

Axial preloading of the sleeves 136 and 138 for elimination of backlash is accomplished by turning of the first cap 116 in a rotational direction to cause the cup bearing wall 152 to advance inward and apply inward axial force against the first ring gear 142. Threaded recesses 163 are provided in the caps 116 and 120 for turning of the caps. To avoid interference of the second cap 120 with the adjustment process, the second cap is loosened while the adjustment is taking place. Without loosening the second cap 120, the inward adjustment of the first cap 116 is limited since the adjustment also drives the shaft 124 toward the second end cap and into engagement with the thrust bearing 126 positioned between the second cap and the shaft. The stop ring 150 maintains the ring gears 142 and 146, the sleeves 136 and 138 and the piston 140 in place within the body 112 when the second cap 120 is loosened.

By inward adjustment of the first cap 116, the first ring gear moves axially, but is prevented from rotating by the grooves 144 and pin 145. This axially inward movement carries the balls 162 in the ball race 158 formed on the first ring bear 142 into firm seated contact with the ball race 160 formed on the first sleeve 136 to eliminate all slack therebetween. The continued inward adjustment of the first cap 116 rotates the first sleeve 136 and the ball race 156 formed on the first sleeve carries the balls 162 therein into firm seated contact with the corresponding ball race 154 formed on the shaft 124 to eliminate all slack therebetween. Continued inward adjustment causes the shaft 124 to rotate and the other ball race 154 formed on the shaft to carry the balls 162 therein into firm seated contact with the ball race 156 formed on the second sleeve 138 to eliminate all slack therebetween. The continued upward adjustment causes the second sleeve 138 to rotate and the ball race 160 formed on the second sleeve carries the balls 162 therein into firm seated contact with the ball race 158 formed on the second ring gear 146 to eliminate all slack therebetween.

Since the second ring gear 146 is restrained against rotational movement by the grooves 148 and the pin 149 continued inward adjustment of the first cap 116 will set the desired axial loading on the sleeves 136 and 138. As such, all slack between the ring gears 142 and 146, the sleeves 136 and 138 and the shaft 124 is eliminated simultaneously with one easy external adjustment of the first end cap 116. It is noted that the adjustment also eliminates any slack that may exist between the grooves 144 and 148 and the pins 145 and 149.

With the adjustment complete, the first end cap 116 is then locked in the position at which all slack has been eliminated, using a set screw or the like (not shown). The ring gears 142 and 146, and the sleeves 136 and 138 are thereby maintained in their adjusted relative positions during usage of the actuator 10. With the first cap 116 in its adjusted position to eliminate all slack, the second cap 120 is advanced inwardly to properly set the shaft 124 between the first and second caps 116 and 120 and to axially load the thrust bearings 126.

Figure 4:
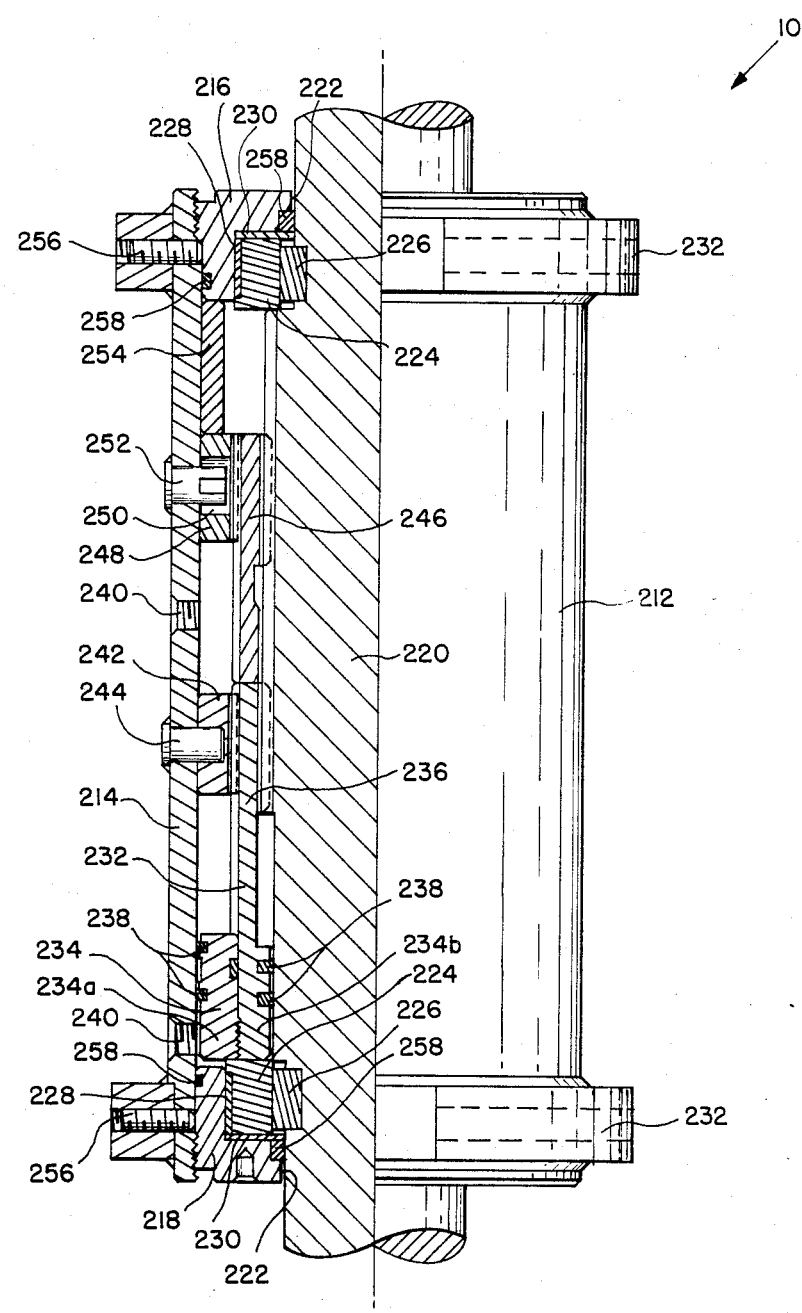
FIG. 4 is a side elevational, sectional view of a third alternative embodiment of the invention, showing a splined actuator using ring gears with an adjusting end cap.

A third alternative embodiment of the invention, similar to the second embodiment, is shown in FIG. 4. In this third embodiment, the actuator 10 includes an elongated body 212 having a cylindrical side wall 214. First and second end caps 216 and 218, respectively, are threadably attached to the body 212 at opposite ends thereof. A rotary shaft 220 is coaxially positioned within the body 212 and extends outwardly thereof through a central aperture 222 in each of the caps 216 and 218. A bearing support ring 224 is attached to each end portion of the shaft 220 by a key 226 and is held there adjacent to one of the caps. Positioned between the bearing support ring 224 and the radially inward facing wall of each of the caps 216 and 218 is a sleeve bearing 228, and positioned between the support ring and an axially inward facing wall of each cap is a thrust ring bearing 230.

A flange 232 is provided at each end of the body 212 for attachment of the body to a stationary support frame (not shown), and the shaft 220 is attachable to an external device (not shown). Within the body, the shaft 220 has a splined portion located toward the first cap 216 and a smooth wall portion located toward the second cap 218. A piston sleeve 232 is coaxially and reciprocally mounted within the body about the shaft 220. The piston sleeve 232 has a two piece head portion 234 and an interiorly and exteriorly splined sleeve portion 236. The head portion 234 includes an outer piston head ring 234a interiorly threaded to an inner piston head ring 234b. The inner piston ring 234b is formed integrally with the sleeve portion 236.

The head portion 234 is positioned for movement along the smooth wall portion of the shaft 220, and the sleeve portion 236 is positioned for its interior splines to intermesh with the splined portion of the shaft. The exterior splines of the sleeve portion 236 intermesh with the splines of a fixed splines ring gear 242 fixedly attached to the sidewall 214 by an attachment pin 244 extending through the sidewall and into the ring gear.

Conventional seals 238 are provided between the shaft 220 and the inner piston ring 234b, between the sidewall 214 and the outer piston ring 234a, and between the outer and inner piston rings to provide fluid-tight compartments to each side of the piston head portion 234. Reciprocation of the piston sleeve 232 within the body 212 occurs when hydraulic fluid or air under pressure selectively enters through ports 240 in the side wall 214 which communicate with the fluid tight compartments to each side of the piston head portion 234.

An independently rotatable sleeve 246 is coaxially and reciprocally mounted within the body about the shaft to a side of the piston sleeve 232 toward the first cap 216. The axially inward facing end walls of the sleeve portion 236 of the piston sleeve 232 and the sleeve 246 are in sliding engagement.

The sleeve 246 has interior splines intermeshing with the splines of the shaft 220, and exterior splines intermeshing with the splines of an adjustable splined ring gear 248. The adjustable ring gear 248 has a generally axially extending slot 250 therein and a pin 252 projecting through the sidewall 214 and into the slot. The pin 252 is slidably received within the slot 250 and permits axial movement of the ring gear, but restrains the ring gear against rotational movement.

Positioned between the first cap 216 and the adjustable ring gear 248 and in sliding engagement with both, is a cylindrical bearing ring 254 for tramitting the axially inward movement of the cap to the adjustable ring gear for purposes of preloading the piston sleeve 232 and the sleeve 246 to eliminate backlash. Turning of the first cap 216 to advance the cap axially inward applies an axially inward force on the adjustable ring gear 248 and moves the ring gear inward.

Much as described for the embodiment for FIG. 3, inward adjustment of the first cap 216 produces axially inward movement of the adjustable ring gear 248 bringing the splines thereof into firm contact with the exterior splines of the sleeve 246 to eliminate all slack therebetween. Continued inward adjustment rotates the sleeve 246 and moves the interior splines of the sleeve into firm contact with the splines of the shaft 220 to eliminate all slack therebetween. Further inward adjutment rotates the shaft 220 and moves the splines thereof into firm contact with the interior splines of the sleeve portion 236 of the piston sleeve 232 to eliminate all slack therebetween. Yet further inward adjustment of the first cap 216 rotates the piston sleeve 232 and brings the exterior splines of the sleeve portion 236 into firm contact with the splines of the fixed ring gear 242. The first cap 216 may then be advanced inward to set a desired axial preloading force on the sleeve 246 and the piston sleeve 232.

The first cap 216 is left in the position at which all slack has been eliminated, and the relative positions of the sleeve 246 and the piston sleeve 232 are thereby locked and maintained during use of the actuator 10. An externally adjustable set screw 256 is provided for each of the caps 216 and 218 for locking the caps in place to prevent any unintentional rotation. As described for the embodiment of FIG. 3, the second cap 218 is backed off during adjustment of the first cap 216 to avoid any interference, and then the second cap is adjusted for proper axial positioning of the shaft and loading on the thrust bearings 230.

Conventonal seals 258 are provided between the caps 216 and 218 and the sidewall 214 and between the caps and the shaft 220 to prevent fluid from leaking from the interior of the body 212.

Figures 5, 6:
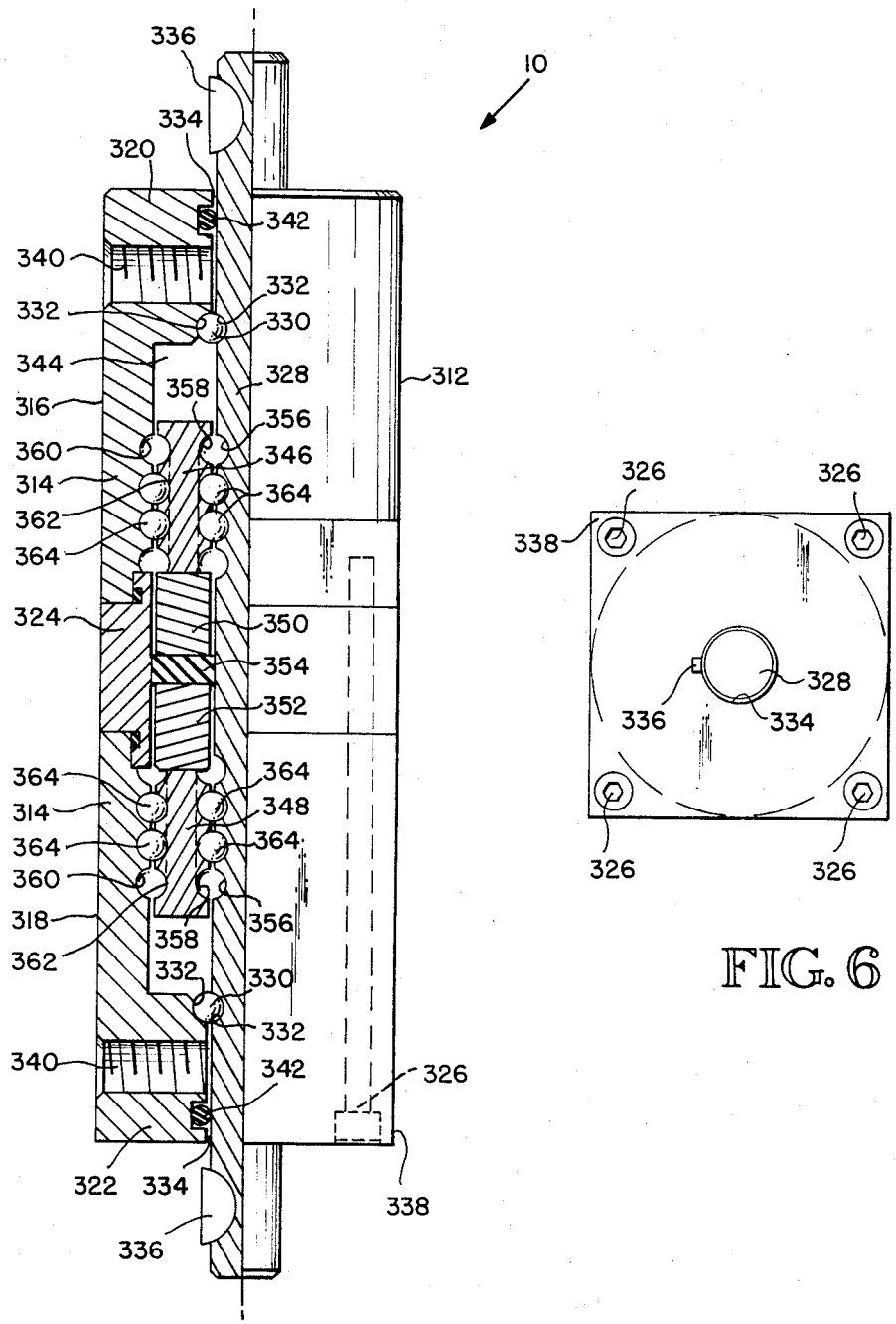
FIG. 5 is a side elevational, sectional view of a fourth alternative embodiment of the invention, showing a ball screw actuator using an internally positioned resilient member.
FIG. 6 is an end elevational view of the actuator of FIG. 5.

A fourth alternative embodiment of the invention is shown in FIG. 5. In this embodiment, the actuator 10 includes an elongated body 312 having a cylindrical sidewall 314 and first and second end walls 320 and 322. The body 312 is constructed of first and second cylindrical assemblies 316 and 318, respectively, each having an open end and a closed end. The body half-assemblies 316 and 318 are rigidly secured together by their open ends, with an annular mid-section wall 324 positioned therebetween, by a plurality of elongated, circumferentially spaced fasteners 326. The fasteners 326 are positioned in bore holes extending between the half-assemblies 316 and 318 through the mid-section wall 324. The circumferential spacing of the fasteners 326 is shown in FIG. 6.

A rotary shaft 328 is coaxially positioned within the body 312 and supported for rotation relative to the body by axial thrust bearings 330 positioned in corresponding ball races 332 formed on the shaft 328 and the end walls 320 and 322. The shaft 328 extends through an aperture 334 in each of the end walls 320 and 322 and projects therebeyond for connection to an external device (not shown) by keys 336. The second body half-assembly 318 has at its axially outward end a rectangular flange 338 by which the actuator 10 is connected to a stationary support (not shown).

A port 340 extends radially through each of the end walls 320 and 322 and communicates with the aperture 334 therein. Conventional seals 342 are provided between the end walls 320 and 322 and the shaft 328, located axially outward of the ports 340, to provide a fluid-tight chamber 344 within the body 312.

A first sleeve 346 is coaxially and reciprocally mounted within the chamber 344 of the body 312 about the shaft 328 toward the first end wall 320, and a second sleeve 348 is coaxially and reciprocally mounted within the chamber about the shaft toward the second end wall 322. Positioned between the first and second sleeves 346 and 348 are first and second annular pistons 350 and 352, respectively. The pistons 350 and 352 are coaxially and reciprocally mounted within the chamber 344 about the shaft 328, with the axially outward facing end wall of the first piston slidably engaging the corresponding end wall of the first sleeve 346 and the axially outward facing end wall of the second piston slidably engaging the corresponding end wall of the second sleeve 348.

Positioned between the pistons 350 and 352 is an elastomeric ring. As will be described in more detail below, the elastomeric ring 354 provides an axially outward force on each of the sleeves 346 and 348 to provide automatic axial preloading of the sleeves to eliminate backlash. The elastomeric ring 354 extends radially inward and outward beyond the radial sidewalls of the pistons 350 and 352 to provide fluid-tight seals between the pistons and a smooth wall portion of the shaft 328 and a smooth interior wall portion of the mid-section wall 324 to define a fluid-tight compartment to each axially outward side of the pistons.

The shaft 328 has a pair of helical ball races 356 formed thereon, to each side of the smooth wall portion of the shaft, each confronting and corresponding to a helical ball race 358 formed on the radially inward facing wall of each of the sleeves 346 and 348. The ball races 356 and 358 have substantially identical lead and pitch, and form a pair of laterally confined, variable length, inner ball channels defined by the area of coincidence of the corresponding ball races. The radially inward facing wall of the sidewall 314 of each body-half assembly 316 and 318 has a helical ball race 360 formed thereon confronting and corresponding to a ball race 362 formed on the radially outward facing wall of each of the piston sleeves 346 and 348. The ball races 360 and 362 have substantially identical lead and pitch, and form a pair of laterally confined, variable length outer ball channels defined by the area of coincidence of the corresponding ball races.

A plurality of balls 364 are disposed in each of the inner and outer channels for transmission of torque between the first sleeve 346 and the shaft 328, between the first sleeve and the sidewall 314 of the first half assembly 316, between the second sleeve 348 and the shaft, and between the second sleeve and the sidewall of the second half-assembly 318. As previously described for other embodiments, the blocked ends of the ball races and the axially outward facing end walls of the pistons 350 and 352 serve as stops to engage and limit the travel of the balls 364 and to regroup the balls. As with the embodiment shown in FIG. 3, the ball races 358 and 362 of the sleeves 346 and 348 have their axially outward ends terminating in a blocked end and their axially inward ends open and running out into the interior chamber 344 of the body 312.

As the pistons 350 and 352 linearly reciprocate between one or the other axial directions within the chamber 344 upon the selective application of hydraulic fluid or forced air to the ports 340, torque is transmitted by the balls 364 through the coaction of the ball races 362 on the sleeves 346 and 348 with the ball races 360 on the sidewall 314. The transmitted torque causes the sleeves 346 and 348 to rotate as they move axially. The resulting linear and rotational movement of the sleeves 346 and 348 is transmitted by the balls 364 through the coaction of the ball races 358 on the sleeves with the ball races 356 on the shaft 328. The transmitted torque causes the shaft 328 to rotate relative to the body 312 since axial movement of the shaft is restricted by the thrust bearings 330.

With the embodiment of the invention shown in FIG. 5, no operator adjustment is required to eliminate backlash. This is particularly useful for actuators having a small size or construction which makes the use of internal adjustment components and external access ports impractical. With this embodiment, the axial thickness of the elastomeric ring 354 is selected such that it will be placed in a compressed state when in position between the pistons 350 and 352 when the half-assemblies 316 and 318 of the body 12 are secured together using the fasteners 326. It is noted that the fasteners 326 only place the elastomeric ring 354 in a compressed state, and do not serve any further adjustment purpose. The elastomeric ring 354 is selected to have sufficient resiliency to exert an axially outward force on the sleeves 346 and 348 when in the compressed state to move the sleeves axially outward relative to each other for preloading of the sleeves to eliminate backlash. The elastomeric ring 354 is also selected with a stiffness or resiliency sufficient to exert an axially outward force at least as great as the axially inward force being exerted by the pistons 350 and 352 on the elastomeric ring during normal fluid-powered operation of the actuator 10. As such, the preloading of the sleeves 346 and 348 is automatic and is maintained during operation, even if components should wear.

For ease of explanation, the automatic elimination of slack will first be described assuming the inside and outside channels exhibit the same degree of slack. The elastomeric ring 354 applies an equal and oppositely directed axially outward force to each of the sleeves 346 and 348. The outward force moves the first sleeve 346 axially toward the first end wall 320 and carries the balls 364 in the ball race 358 formed on the first sleeve into firm seated contact with the corresponding ball races 356 formed on the shaft 328 to eliminate all slack therebetween. Simultaneously, the axially movement of the first sleeve 346 carries the balls 364 in the ball race 362 formed on the first sleeve into firm seated contact with the ball race 360 formed on the sidewall 314 of the first half-assembly 316 to eliminate all slack therebetween.

The outward force also moves the sleeve 348 axially toward the second end wall 322 and carries the balls 364 in the ball races 358 formed on the second sleeve into firm seated contact with the corresponding ball race 356 on the shaft 328 to eliminate all slack therebetween. Simultaneously, the axial movement of the second sleeve 348 carries the balls 364 in the ball race 362 formed on the second sleeve into firm seated contact with the ball race 360 formed on the sidewall 314 of the second half-assembly 318 to eliminate all slack therebetween.

Should the slack in one of the outer or inner channels exceed the slack in the other, the axially outward force exerted by the elastomatic ring 354 on the sleeves 346 and 348 after the slack has been completely eliminated from the channel with the lesser slack, will cause the sleeves to rotate in opposite directions and move axially apart until the excess slack is eliminated. Since the sleeves 346 and 348 are free to rotate relative to each other when the channel with the lesser slack has all slack removed, the channel will cause the rotation of the sleeves in opposite rotational directions in response to the axially outward force still being applied by the elastomeric ring. The rotation will continue and produce axial separation of the sleeves 346 and 348 until the balls of the ball races of the sleeves forming the channel with the excess slack are carried into firm seated contact with the corresponding ball races forming the channel. It is noted that while the sleeves 346 and 348 rotate to adjust for the excess slack in the one channel, the opposite rotation of the sleeves produce no rotation of the shaft 328, since the elastomeric member 354 applies an equal and opposite force on each of the sleeves and the force each sleeve tends to apply to the shaft is of equal magnitude and of opposite rotational direction.

At such time that the sleeves 346 and 348 will have rotated sufficiently apart to produce enough axial separation to eliminate all slack in the torque transmitting members and a steady state will be reached and all backlash eliminated. So long as the axially inward force applied to the pistons 350 and 352 by the fluid pressure during operation is not so great as to overcome the axially outward force of the elastomeric ring 354 necessary to maintain the sleeves 346 and 348 in their separated state with all slack eliminated, the actuator 10 will operate without backlash. Should usage of the actuator 10 cause wear of the ball races or the balls therein, or should slack occur for any other reason, the slack will be automatically eliminated by the elastomeric ring 354 so long as the ring has sufficient additional resiliency to compensate for the wear.

Although the embodiment of the invention shown in FIG. 5 has been described using an elastomeric ring 354, the invention may be practiced using any other suitable resilient member, such as a Belleville washer, or one or more springs.

A fifth alternative embodiment of the invention is shown in FIG. 7. In this embodiment, the actuator 10 includes an elongated body 412 having a cylindrical sidewall 414, and first and second ends 418 and 420, respectively. A rotary shaft 416 is coaxially positioned within the body 412 and supported for rotation relative to the body. The shaft 416 has a radially outward extending flange portion 422 positioned toward the second end 420 and rotatably held in place therein against inward thrust by a thrust bearing 424. The thrust bearing 424 is disposed in circumferential ball race 426 formed on the sidewall 414 toward the second end 420, and a corresponding ball race 428 formed on the axially outward facing wall of the flange portion 422.

A threaded cap 430 is positioned at the first end 418 of the body 412 and has a central aperture 432 therein. The cap 430 has a collar 433 positioned about the shaft 416 and extending axially inward. Threadedly attached to the shaft 416 toward the first end 418 is a circular nut 434. The nut 434 is positioned in the aperture 432 of the cap 430 and supported therein by a thrust bearing 436 positioned between the nut and the cap. The thrust bearing 436 is disposed in a circumferential ball race 438 formed on the radially inward facing wall of the cap 430 about the aperture 432, and a corresponding ball race 440 formed on the nut 430. The nut 434 is adjustable on the shaft 416 for axial loading of the thrust bearings 424 and 436. The shaft 416 is adapted for coupling to an external device (not shown) and the body 412 is adapted for attachment to a stationary support frame (not shown).

A piston sleeve 442 is coaxially and reciprocally mounted within the body 412 about the shaft 416. The piston sleeve 442 has a head portion 444 positioned toward the first end 418 of the body 412 with the collar 433 disposed between the head portion and the shaft, and a sleeve portion 446 extending axially inward therefrom. The head portion 444 carries conventional inner and outer seals 448 disposed between the head portion and corresponding smooth wall portions of the collar 433 and the sidewall 414 to define fluid-tight compartments to each side of the head portion.

An annular sleeve 450 is coaxially and reciprocally mounted within the body 412 about the shaft 416 toward the second end 420 of the body. Positioned between the axially inward facing wall of the sleeve portion 446 of the piston sleeve 442 and the axially inward facing wall of the sleeve 450 is a bearing ring 452. The sleeve portion 446 and the sleeve 450 are independently rotatable within at least a limited range for backlash adjustment purposes, and are in slidable engagement with each other through the bearing ring 452.

A helical ball race 454 is formed on the shaft 416 confronting and corresponding to a pair of helical ball races 456 formed on the radially inwardly facing wall of each of the sleeve portion 446 and the sleeve 450. The ball races 454 and 456 have substantially identical lead and pitch, and form a pair of laterally confined, variable length inner ball channels defined by the area of coincidence of the corresponding ball races.

The sidewall 414 has a helical ball race 458 formed thereon confronting and corresponding to a pair of ball races 460 formed on the radially outward facing wall of each of the sleeve portion 446 and the sleeve 450. The ball races 458 and 460 have substantially identical lead and pitch, and form a pair of laterally confined variable length outer ball channels defined by the area of coincidence of the corresponding ball races.

A plurality of balls 462 are disposed in each of the inner and outer channels for transmission of torque between the sleeve portion 446 of the piston sleeve 444 and the shaft 416, between the sleeve portion and the sidewall 414, between the sleeve 450 and the shaft, and between the sleeve and the sidewall. The bearing ring 452 serves as a ball stop, as do certain of the blocked ends of the ball races in the manner previously described, to engage and limit travel of balls 462 and to regroup the balls. As with the previous embodiments, the dashed lines on FIG. 7 indicate the extent of the ball races. The bearing ring 452, in addition to another function that will be described below, serves to prevent the balls 462 from passing out of the open ball race ends and into another open end.

As the piston sleeve 442 and the sleeve 450 linearly reciprocate between one or the other axial directions within the body 412, torque is transmitted by the balls 462 through the coaction of the ball race 458 on the sidewall 414 with the ball race 460 on the sleeve portion 446 and the sleeve 450. The transmitted torque causes the piston sleeve 442 and the sleeve 450 to rotate as they move axially. The resulting linear and rotational movement of the piston sleeve 442 and the sleeve 450 is transmitted by the balls 462 through the coaction of the ball races 456 on the sleeve portion 446 and the sleeve 450 with the ball races 454 on the shaft 416. The transmitted torque causes the shaft 416 to rotate relative to the body 412 since axial movement of the shaft is restricted by the thrust bearings 424 and 436.

The actuator 10 is further provided with an axially extendable set screw 464 threadably received in a threaded axial bore 466 extending through the sleeve 450. The set screw 464 is inwardly adjustable to project from the sleeve 450 and engage the bearing plate 452 and therethrough apply an adjustable and oppositely directed axially outward force on each of the sleeve portion 446 of the piston sleeve 442 and the sleeve 450. The force moves the piston sleeve 442 relative to the sleeve 450 for axially preloading the piston sleeve and the sleeve.

An access port 468 is provided in the flange portion 422 of the shaft 416 for access to the set screw 464 for its adjustment without disassembling the piston sleeve 442 or the sleeve 450 from the body 412. The access port 468 is closed with a threaded cap 470 when not in use to prevent the leakage of fluid therefrom. In the presently preferred embodiment of the invention, the actuator 10 will be provided with several set screws 464 circumferentially spaced about the sleeve 450 in a balanced arrangement.

In operation, the inward adjustment of the set screw 464 to apply axially outward directed force on the piston sleeve 442 and the sleeve 450 operates to eliminate the slack between the ball races in much the same manner as previously described for the elastomeric ring in the embodiment shown in FIG. 5. That is, the inward adjustment of the set screw 464 first causes axial separation of the sleeve portion 446 of the piston sleeve 442 and the sleeve 450 to eliminate slack in the inner and outer channels. If the slack in one of the channels exceeds the slack in the other, the continued inward adjustment of the set screw 464 after the slack has been completely eliminated from the channel with the lesser slack, will produce opposite rotation of the piston sleeve 442 and the sleeve 450 and move them axially apart until the excess slack is eliminated. In this embodiment of the invention, the actuator 10 is not limited to the amount of fluid pressure that can be applied to the piston sleeve 442 during fluid powered operation once all backlash has been eliminated to maintain the proper adjustment, as is the case when the elastomeric ring 354 of another resilient member is used for the automatic adjustment to eliminate backlash (See FIG. 5).

A sixth alternative embodiment of the invention is shown in FIG. 8, similar in construction to the embodiment shown in FIG. 7 except as will be hereinafter described. For ease of understanding, the components of the sixth embodiment have been similarly numbered with those of FIG. 7. In the sixth embodiment, the cap 430 is eliminated, and the shaft thrust bearing 436 is positioned between the nut 434 and the sidewall 414, with the ball race 438 being formed on the sidewall. In the sixth embodiment, the torque transmitting ball races and balls have been replaced with corresponding screw threads 472 formed on the sleeve portion 446 of the piston sleeve 442, the sleeve 450, the shaft 416 and the sidewall 414 and with roller screws 474 and 476 positioned therebetween.

While a single roller screw is shown, a plurality of roller screws are used circumferentially positioned one adjacent the next, and in parallel arrangement. To eliminate axial travel of the roller screws 474 and 476, stops 478 are formed on the sidewall 414, the piston sleeve 442 and the sleeve 450 located at the end of the roller screws.

In the sixth embodiment of the invention, the bearing ring 452 has been eliminated and the set screw 464 bears directly on the axially inward facing end wall of the sleeve portion 446 of the piston sleeve 442. As before described, the piston sleeve 442 and the sleeve 450 are independently rotatable and the set screw 464 slidably engages the sleeve portion 446.

Figure 9:
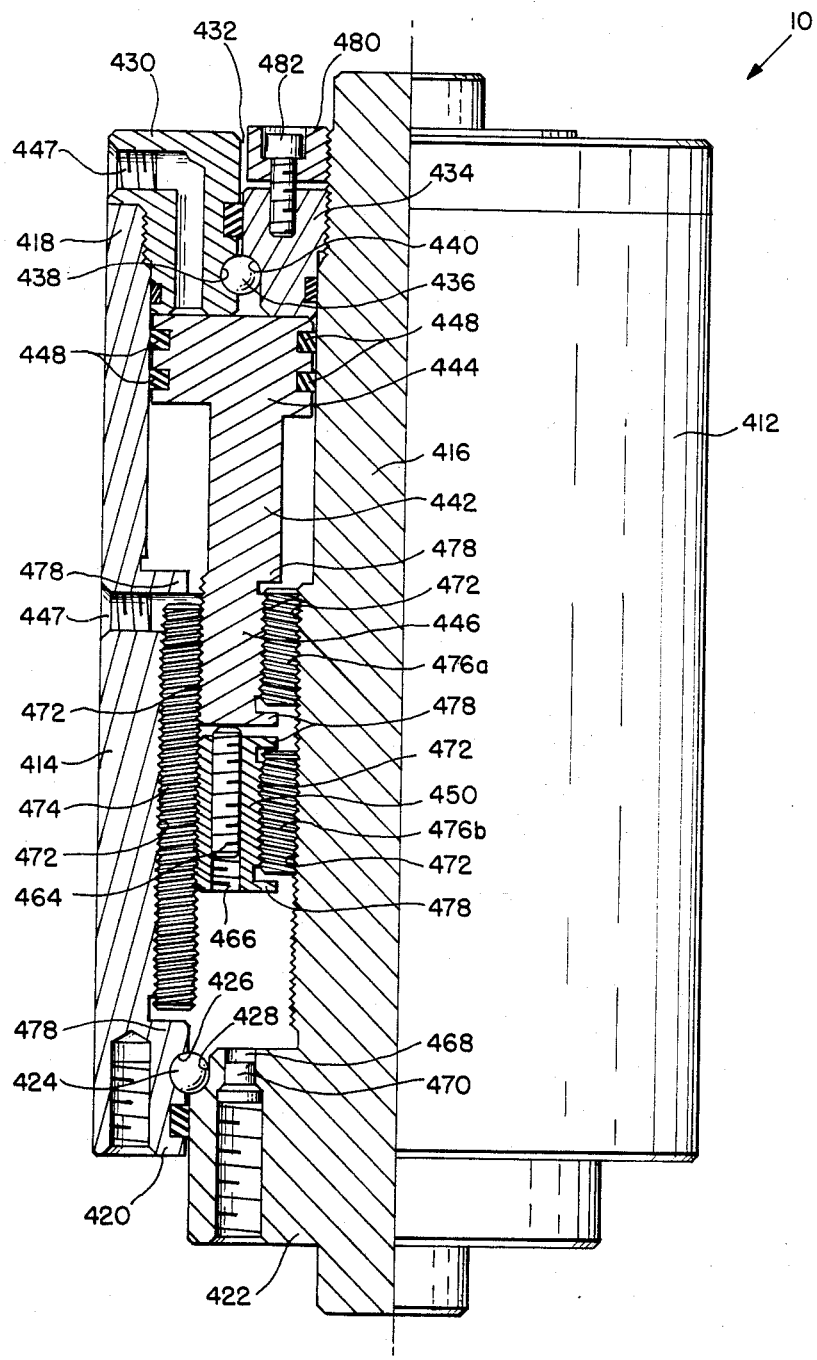
FIG. 9 is a side elevational, sectional view of a seventh alternative embodiment of the invention, showing another roller screw actuator using a set screw adjustment.

A seventh alternative embodiment of the invention is shown in FIG. 9, and similar in construction to the embodiments of FIGS. 7 and 8 and carrying the same reference numerals except as necessary to indicate the differences in structure. In the embodiment of FIG. 9, one of the fluid port 447 passes through the cap 430, rather than the sidewall 414. Furthermore, a second shaft nut 480 is provided axially outward of the first nut 434 and is attachable to the first nut using fasteners 482 to lock it in place relative to the first nut.

As with the embodiment of the invention in FIG. 8, roller screws are used seated in correspondingly threaded portions of the sidewall 414, the sleeve portion 446, the sleeve 450 and the shaft 416. The inner roller screw has, however, been replaced with two roller screws 476a and 476b which transmit torque between the piston sleeve 442 and the shaft 416 and between the sleeve 450 and the shaft, respectively.

Figure 10:
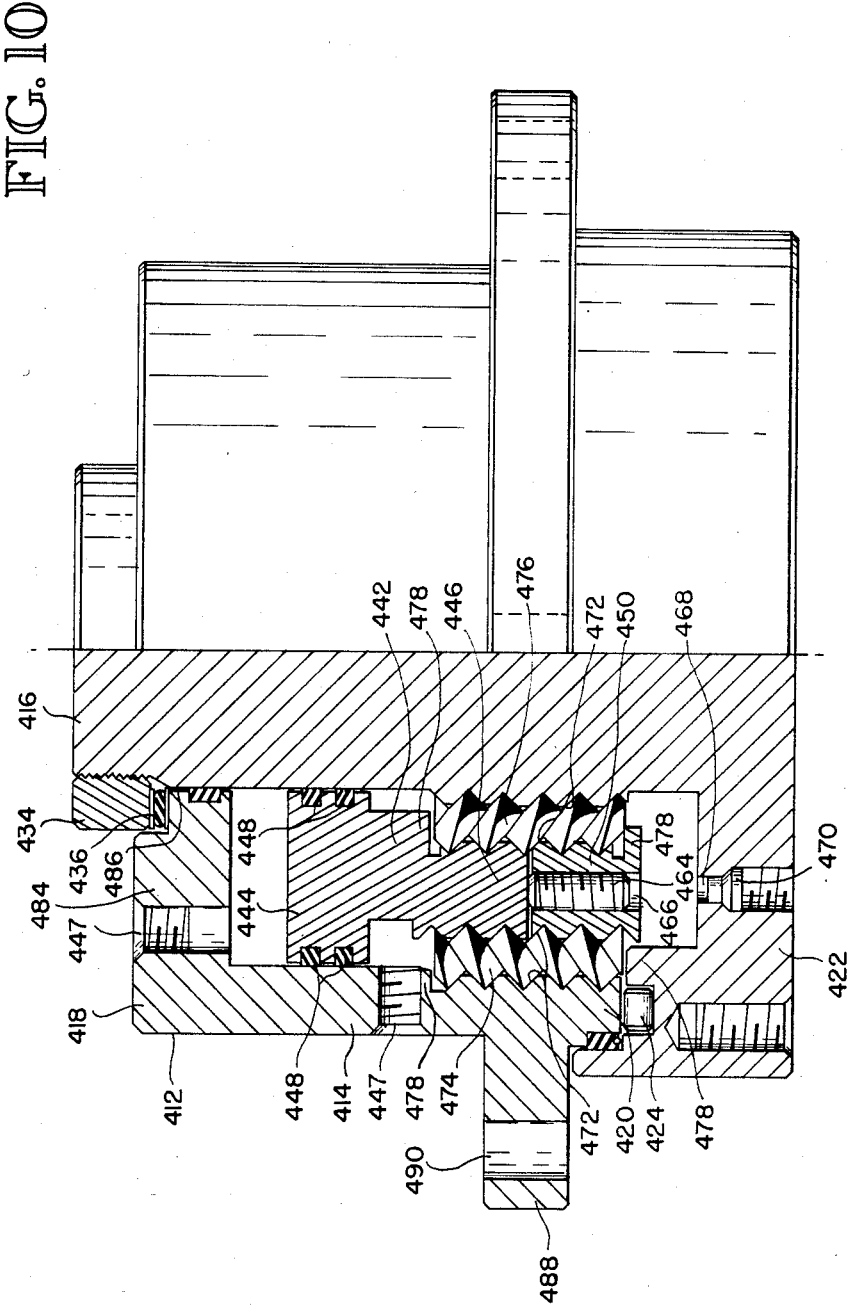
FIG. 10 is a side elevational, sectional view of an eighth alternative embodiment of the invention, showing another roller screw actuator using a set screw adjustment.

An eighth alternative embodiment of the invention is shown in FIG. 10 of similar construction to the embodiment of FIGS. 7-9 and similarly numbered. In the eighth embodiment the flange portion 422 of the shaft 416 is positioned axially outward of the second end 420 of the body 412 and extends radially outward therebeyond. The thrust bearing 424 is a roller bearing positioned between the end wall of the body 412 at the second end 420 and a race formed in the axially inward facing wall of the flange portion 422. The thrust bearing 436 at the first end 418 is positioned between the nut 434 and an end wall 484 of the body 412. The shaft 412 extends through a central aperture 486 in the end wall 484. An outwardly extending circumferential flange 488 is fixedly attached to the body 412 and has a plurality of bore holes 490 extending therethrough for attachment to a support frame or an external device (not shown).

It will be appreciated that, although specific embodiments of the invention have been described herein for purposes of illustration, various modifications may be made without departing from the spirit and scope of the invention. Accordingly, the invention is not limited except by the appended claims.

I claim:

1. A fluid-powered actuator, comprising:
   a body;
   a rotatable member supported for rotation relative to said body and connectable to an external device;
   a first member reciprocally mounted within said body;
   a second member reciprocally mounted within said body coaxial with said first member, said first and second members being independently and adjustably rotatable and axially movable within at least a limited range relative to the other;
   at least one piston reciprocally mounted within said body for application of fluid pressure to one or the other opposing sides thereof to produce axial movement of said piston, said piston operatively engaging at least one or the other of said first and second members to axially move said members in response to axial movement of said piston;
   first torque-transmitting means for transmitting torque between said first member and said body;
   second torque-transmitting means for transmitting torque between said first member and said rotatable member;
   third torque-transmitting means for transmitting torque between said second member and said rotatable member;
   fourth torque-transmitting means for transmitting torque between said second member and said body, at least said first and fourth torque-transmitting means or said second and third torque-transmitting means producing relative rotational movement between said body and said rotatable member in response to axial movement of said piston, and said first, second, third and fourth torque-transmitting means producing movement of said first and second members in unison and in the same axial direction with substantially equal axial travel in response to axial movement of said piston during fluid powered operation; and
   adjustment means for selectively and adjustably moving said first member in one or the other of a rotational or axial direction relative to said second member within said limited range by an amount sufficient to axially preload said first and second members equally with respect to said first, second, third and fourth torque-transmitting means with a desired force, and for maintaining axial preloading of said first and second members during fluid powered operation once so adjusted for equalized preloading to substantially eliminate backlash in said first, second, third and fourth torque-transmitting means as said piston moves from one axial direction to the other to produce relative rotational movement between said body and said rotatable member in response to selective application of fluid pressure to said piston.

2. A fluid-powered actuator, comprising:
a body;
a rotatable member supported for rotation relative to said body and connectable to an external device;
a first member reciprocally mounted within said body;
a second member reciprocally mounted within said body coaxial with said first member, said first and second members being independently and adjustably rotatable and axially movable within at least a limited range relative to the other;
at least one piston reciprocally mounted within said body for application of fluid pressure to one or the other opposing sides thereof to produce axial movement of said piston, said piston operatively engaging at least one or the other of said first and second, members to axially move said members in response to axial movemment of said piston;
first torque-transmitting means for transmitting torque between said first member and said body;
second torque-transmitting means for transmitting torque between said first member and said rotatable member;
third torque-transmitting means for transmitting torque between said second member and said rotatable member;
fourth torque-transmitting means for transmitting torque between said second member and said body, at least said first and fourth torque-transmitting means or said second and third torque-transmitting means producing relative rotational movement between said body and said rotatable member in response to axial movement of said piston; and
an axially adjustable member extending between and engaging each of said first and second members, said adjustment member providing an adjustable and oppositely directed axial force on said first and second members to move said first member axially relative to said second member while allowing at least one of said first or second members to move axially and rotationally independent of the other in response thereto within said limited range by an amount sufficient to axially preload said first and second members equally with respect to said first, second, third and fourth torque-transmitting means with a desired force and to substantially eliminate backlash in said first, second, third and fourth torque-transmitting means as said piston moves from one axial direction to the other to produce relative rotational movement between said body and said rotatable member in response to selective application of fluid pressure to said piston.

3. The actuator of claim 2 wherein said piston is positioned axially outward of and fixedly attached to one of said first or second members for axial movement thereof.

4. The actuator of claim 2 wherein said adjustable member includes a plurality of set screws threadably attached to one of said first or second members and projecting toward and slidably engaging the other of said first or second members, said set screws being turnable in one direction forcing said first and second members to move relative to each other for axially preloading said first and second members.

5. The actuator of claim 4 wherein said set screws are turnable to exert an axially outward force on each of said first and second members.

6. The actuator of claim 5 further includes a bearing member positioned between said first and second members, said set screw being positioned to engage said bearing member and apply said axially outward force on the other of said first or second members through said bearing member.

7. The actuator of claim 2 wherein said adjustable member is positioned completely within said body and wherein said adjustable member extends through an aperture in one of said first or second members and is adjustably extendable therefrom toward the other of said first or second members, and further including a sealable adjustment port in said body for access to said adjustable member for its adjustment.

8. The actuator of claim 2 wherein said adjustable member is adjustably attached to said second member and projects toward and slidably engages said first member, said adjustable member being selectively extendable to exert an axially outward force on said first and second members.

9. The actuator of claim 1 wherein said first, second, third and fourth torque-transmitting means include coacting grooves formed on said first and second members, on said body and on said rotatable member, said grooves of said first and fourth torque-transmitting means have a substantially identical lead and hand turn, and said grooves of said second and third torque-transmitting means have a substantially identical lead and hand turn.

10. The actuator of claim 9 wherein said grooves are ball races positioned in confronting and corresponding relationship to form ball channels, and said first, second, third and fourth torque-transmitting means further include one or more balls seated in each of said ball channels.

11. The actuator of claim 9 wherein said grooves are screw threads, positioned in corresponding relationship and said first, second, third and fourth torque-transmitting means further include one or more roller screws seated between corresponding threaded portions of said first and second members, said body and said rotatable member.

12. The actuator of claim 1 wherein said adjustment means includes means for adjustably axially moving said first member relative to said second member while allowing at least one of said first or second members to move axially and rotationally independent of the other in response thereto within said limited range by an amount sufficient to eliminate backlash and axially preload said first and second members.

13. A fluid-powered actuator, comprising:
a body;
an axially extending rotatable shaft positioned within said body and supported for rotation relative to said body;
a first sleeve mounted within said body for axially directed reciprocal movement;
a second sleeve generally coaxial with said first sleeve and mounted within said body for axially directed reciprocal movement, said first and second sleeves being independently and adjustably rotatable and axially movable within at least a limited range relative to the other;

an annular piston reciprocally mounted within said body for application of fluid pressure to one or the other opposing sides thereof to produce reciprocal axial movement of said piston, said piston being fixedly attached to one or the other of said first or second sleeves to axially move said sleeves in response to axial movement of said piston;

first torque-transmitting means for transmitting torque between said first sleeve and said body;

second torque-transmitting means for transmitting torque between said first sleeve and said shaft;

third torque-transmitting means for transmitting torque between said second sleeve and said shaft;

fourth torque-transmitting means for transmitting torque between said second sleeve and said body, at least said first and fourth torque-transmitting means or said second and third torque-transmitting means producing relative rotational movement between said body and said rotatable member in response to axial movement of said piston; and an adjustment member extending between and engaging each of said first and second sleeves, said adjustment member being adjustably attached to said second sleeve and projecting toward and slidably engaging said first sleeve, and being selectively and adjustably extendable to exert an axially outward force on said first and second sleeves for providing a selectable and oppositely directed axial force on said first and second sleeves to move said first sleeve axially relative to said second sleeve while allowing said first and second sleeves to move axially and rotationally independent of the other in response thereto within said limited range by an amount sufficient to axially preload said first and second sleeves and to substantially eliminate backlash as said piston moves from one axial direction to the other to produce relative rotational movement between said body and said shaft in response to selective application of fluid pressure to said piston.

14. The actuator of claim 12 wherein said adjustment member is positioned within and extends from an aperture in said second sleeve.

15. The actuator of claim 14 wherein said adjustment member is a threaded member extending axially toward said first sleeve, and said aperture in said second sleeve is correspondingly threaded to receive said threaded member.

16. The actuator of claim 15 wherein said aperture extends through to an axially outward side of said second sleeve, and further including means for access to said threaded member through said body for external adjustment thereof without disassembling said second sleeve from said body.

17. The actuator of claim 12 wherein said first and fourth torque transmitting means includes one or more outer roller screws seated between said body and said first and second sleeves and extending axially between said first and second sleeves, each of said outer roller screws coacting with threaded portions of both said first and second sleeves.

18. The actuator of claim 17 wherein said second and third torque-transmitting means includes one or more inner roller screws seated between said shaft and said first and second sleeves, and extending axially between said first and second sleeves, each of said inner roller screws coacting with threaded portions of both said first and second sleeves.

19. The actuator of claim 17 wherein said second torque-transmitting means includes one or more first inner roller screws seated between said first sleeve and said shaft, and said third torque-transmitting means includes one or more second inner roller screws seated between said second sleeve and said shaft, said first roller screws coacting with a threaded portion of said first sleeve and said second roller screws coacting with a threaded portion of said second sleeve.

20. A fluid power device, comprising:
a body;
a rotatable member supported for rotation relative to said body and connectable to an external device;
a first member reciprocally mounted within said body;
a second member reciprocally mounted within said body coaxial with said first member, said first and second members being independently and adjustably rotatable and axially movable within at least a limited range relative to the other;
at least one piston reciprocally mounted within said body and operatively engaging at least one or the other of said first and second members;
first torque-transmitting members for transmitting torque between said first member and said body;
second torque-transmitting members for transmitting torque between said first member and said rotatable member;
third torque-transmitting members for transmitting torque between said second member and said rotatable member;
fourth torque-transmitting members for transmitting torque between said second member and said body, at least said first and fourth torque-transmitting members or said second and third torque-transmitting members producing relative rotational movement between said body and said rotatable member, and said first, second, third and fourth torque-transmitting members producing movement of said first and second members in unison and in the same axial direction with substantially equal axial travel in response to axial movement of said piston during fluid powered operation; and
adjustment means for selectively and adjustably moving said first member in one or the other of a rotational or axial direction relative to said second member within said limited range by an amount sufficient to axially preload said first and second members with a desired force, and for maintaining axial preloading of said first and second members during fluid power operation once so adjusted for preloading to substantially eliminate backlash in said first, second, third and fourth torque-transmitting members as said piston moves from one axial direction to the other to produce relative rotational movement between said body and said rotatable member.

21. A fluid power device, comprising:
a body;
a rotatable member supported for rotation relative to said body and connectable to an external device;
a first member reciprocally mounted within said body;
a second member reciprocally mounted within said body coaxial with said first member, said first and second members being independently and adjustably rotatable and axially movable within at least a limited range relative to the other;

at least one piston reciprocally mounted within said body and operatively engaging at least one or the other of said first and second members;

first torque-transmitting members for transmitting torque between said first member and said body;

second torque-transmitting members for transmitting torque between said first member and said rotatable member;

third torque-transmitting members for transmitting torque between said second member and said rotatable member;

fourth torque-transmitting members for transmitting torque between said second member and said body, at least said first and fourth torque-transmitting members or said second and third torque-transmitting members producing relative rotational movement between said body and said rotatable member; and an axially adjustable member extending between and engaging each of said first and second members, said adjustment member providing an adjustable and oppositely directed axial force on said first and second members to move said first member axially relative to said second member while allowing at least one of said first or second members to move axially and rotationally independent of the other in response thereto within said limited range by an amount sufficient to axially preload said first and second members with a desired force and to substantially eliminate backlash in said first, second, third and fourth torque-transmitting members as said piston moves from one axial direction to the other to produce relative rotational movement between said body and said rotatable member.

22. A fluid power device, comprising:

a body;

an axially extending rotatable shaft positioned within said body and supported for rotation relative to said body;

a first sleeve mounted within said body for axially directed reciprocal movement;

a second sleeve generally coaxial with said first sleeve and mounted within said body for axially directed reciprocal movement, said first and second sleeves being independently and adjustably rotatable and axially movable within at least a limited range relative to the other;

an annular piston reciprocally mounted within said body and fixedly attached to one or the other of said first or second sleeves;

first torque-transmitting means for transmitting torque between said first sleeve and said body;

second torque-transmitting means for transmitting torque between said first sleeve and said shaft;

third torque-transmitting means for transmitting torque between said second sleeve and sleeve and said shaft;

fourth torque-transmitting means for transmitting torque between said second sleeve and said body, at least said first and fourth torque-transmitting means or said second and third torque-transmitting means producing relative rotational movement between said body and said rotatable member, and said first, second, third and fourth torque-transmitting means producing movement of said first and second sleeves in unison and in the same axial direction with substantially equal axial travel in response to axial movement of said piston during fluid powered operation; and an adjustment member extending between and engaging each of said first and second sleeves, said adjustment member being adjustably extendable for providing a selectable and oppositely directed axial force on said first and second sleeves to move said first sleeve axially relative to said second sleeve while allowing said first and second sleeves to move axially and rotationally independent of the other in response thereto within said limited range by an amount sufficient to axially preload said first and second sleeves, and for maintaining axial preloading of said first and second sleeves during fluid power operation once so adjusted for equalized preloading to substantially eliminate backlash as said piston moves from one axial direction to the other to produce relative rotational movement between said body and said shaft in response to selective application of fluid pressure to said piston.

23. The device of claim 22 wherein said adjustment member is adjustably attached to said second sleeve and projects toward and slidably engage said first sleeve, said adjustment member being selectively extendable to exert an axially outward force on said first and second sleeves.

24. The device of claim 23 wherein said adjustment member is positioned within and extends from an aperture in said second sleeve.

25. The device of claim 24 wherein said adjustment member is a threaded member extending axially toward said first sleeve, and said aperture in said second sleeve is correspondingly threaded to receive said threaded member.

26. The device of claim 25 wherein said aperture extends through to an axially outward side of said second sleeve, and further including means for access to said threaded member through said body for external adjustment thereof without disassembling said second sleeve from said body.

27. A fluid-power device, comprising:

a body;

a drive member supported for operational movement relative to said body and connectable to an external device;

a first member reciprocally mounted within said body;

a second member reciprocally mounted within said body coaxial with said first member, said first and second members being independently and adjustably rotatable and axially movable within at least a limited range relative to the other;

at least one piston reciprocally mounted within said body and operatively engaging at least one or the other of said first and second members;

first transmitting members for transmitting torque between said first member and said body;

second transmitting members for transmitting force between said first member and said drive member to operationally move said drive member relative to said body;

third transmitting members for transmitting force between said second member and said drive member to operationally move said drive member relative to said body;

fourth transmitting members for transmitting torque between said second member and said body, at least said first and fourth transmitting members or said second and third transmitting members producing relative operational movement between said body and said drive member, and said first, second third and fourth transmitting members producing movement of said first and second members in unison and in the same axial direction with substantially equal axial travel in response to axial movement of said piston during fluid power operation; and adjustment means for selectively and adjustably moving said first member in one or the other of a rotational or axial direction relative to said second member within said limited range by an amount sufficient to axially preload said first and second members with a desired force, and for maintaining axial preloading of said first and second member during fluid power operation once so adjusted for preloading to substantially eliminate backlash in said first, second, third and fourth transmitting members as said piston moves from one axial direction to the other to produce relative operational movement between said body and said drive member.

28. A fluid power device, comprising:
a body;
a drive member supported for operational movement relative to said body and connectable to an external device;
a first member reciprocally mounted within said body;
a second member reciprocally mounted within said body coaxial with said first member, said first and second members being independently and adjustably rotatable and axially movable within at least a limited range relative to the other;
at least one piston reciprocally mounted within said body and operatively engaging at least one or the other of said first and second members;
first transmitting members for transmitting torque between said first member and said body;
second transmitting members for transmitting force between said first member and said drive member to operationally move said drive member relative to said body;
third transmitting members for transmitting force between said second member and said drive member to operationally move said drive member relative to said body;
fourth transmitting members for transmitting torque between said second member and said body, at least said first and fourth transmitting members or said second and third transmitting members producing relative operational movement between said body and said drive member; and
an axially adjustable member extending between and engaging each of said first and second members, said adjustment member providing an adjustable and oppositely directed axial force on said first and second members to move said first member axially relative to said second member while allowing at least one of said first or second members to move axially and rotationally independent of the other in response thereto within said limited range by an amount sufficient to axially preload said first and second members with a desired force and to substantially eliminate backlash in said first, second, third and fourth transmitting members as said piston moves from one axial direction to the other to produce relative operational movement between said body and said drive member.

29. The device of claim 28 wherein said adjustable member is adjustably attached to said second member and projects toward and slidably engages said first member, said adjustable member being selectively extendable to exert an axially outward force on said first and second members.

* * * * *

UNITED STATES PATENT AND TRADEMARK OFFICE
CERTIFICATE OF CORRECTION

PATENT NO. : 4,683,767
DATED : August 4, 1987
INVENTOR(S) : Paul P. Weyer

It is certified that error appears in the above—identified patent and that said Letters Patent is hereby corrected as shown below:

Title Page:

The title should be changed to "ROTARY ACTUATOR WITH BACKLASH ELIMINATION".

In the Claims:

Claim 14, change dependency from claim 12 to claim 13.

Claim 17, change dependency from claim 12 to claim 13.

Claim 22, line 59, delete the second occurrence of the words "sleeve and".

Claim 23, line 25, the word "engage" should be changed to "engages".

Signed and Sealed this

Tenth Day of May, 1988

*Attest:*

DONALD J. QUIGG

*Attesting Officer*      *Commissioner of Patents and Trademarks*